Patented May 24, 1949

2,470,939

UNITED STATES PATENT OFFICE 2,470,939

RADIO DETECTION AND LOCATION SYSTEM INDICATING AZIMUTH AND ELEVATION

William A. Miller, Port Jefferson, and Eugene R. Shenk, Brooklyn, N. Y., assignors to Radio Corporation of America, a corporation of Delaware Application September 3, 1943, Serial No. 501,050

11 Claims. (Cl. 343—11)

This invention relates to radio object detection and location systems, and particularly to an improved object detection and location system utilizing pulses of radio frequency energy for determining the exact location of an object. The invention is particularly useful as a radio locator of airplanes and ships, and has both military and commercial applications.

An object detection and location system (sometimes referred to as a radio locator) has been proposed and is described in a copending Lindenblad application Serial No. 454,661, filed August 13, 1942, wherein a lobe switching or conical scanning system is employed. Such a lobe switching system involves causing a directive antenna system to sequentially assume four different patterns or lobes corresponding to the four quadrants of a circle. This is done by causing a small deflection of a radio beam at regular intervals through the four quadrants of a circle which is perpendicularly located to the mean axis of the beam, by means of a spinning radiating element positioned off the center or focus of a parabolic reflector, or by spinning a deflecting element off the focus of the parabolic reflector. If a spinning radiating element is employed, it may be rotated around one end as an axis, or preferably, the entire radiating element rotated around a circle without changing its polarization, as by nutation. This type of lobe switching antenna, when employed for radio locating purposes, is able to produce beam deflections at regular intervals when driven by a motor, and is freely movable in all directions under the manual control of the operators for scanning purposes and for pointing the antenna directly on the object to be detected. This type of object detection and locating system employs a transmitter for transmitting periodically repeated ultra short radio wave pulses of extremely short duration. A receiver is used to receive the echo pulses which are reflected back from the object to be detected.

In the system described in the Lindenblad application supra, the spinning antenna is driven by a motor at about sixty revolutions per second. At this speed of rotation, the pulses of ultra high frequency energy are radiated 240 times per second corresponding to a pulse for each quadrant position of each revolution of the antenna. The up and down beam firing positions of the radiated element are used to determine the elevation or vertical position of the object to be detected and located, while the right and left beam firing positions of the radiated element are used to determine the azimuthal or horizontal position of the same object. The radiation patterns or lobes of the beam will, of course, be different for different quadrants of the circle as the radiating element rotates. The antenna system is so designed that the ears of the radiation patterns or lobes overlap in the up and down beam firing positions and also overlap in the right and left beam firing positions. Since the time interval between radiated pulses is quite long compared to the time of each pulse, it will be understood that a pulse reflected by a remote object to be detected will be received at the receiver located adjacent the transmitter during the same quadrant of rotation in which the original pulse is radiated. As an illustration, the pulse radiated during each quadrant position of each revolution of the antenna may have a duration of the order of one or two microseconds.

If the pulses are reflected from a remote object are of equal intensity and if they were radiated in the up and down positions of the rotating radiating element, they will be received during the same up and down positions, and if the radiated pulses were of equal intensity, it follows that the horizontal plane of the antenna system is pointed at the object. If the reflected pulses received during the right and left positions of the rotating radiating element are also of equal intensity, it follows that the vertical plane of the antenna system is also pointed at the object. Under these conditions, the object to be detected is in a direct line with the focus of the antenna. If now, the parabolic reflector of the antenna is made of widely spaced wires in mesh formation, and the object is within visual distance, the illumination of a searchlight placed directly behind the reflector will illuminate the object. It will be apparent that although the vertical plane referred to above is always vertical regardless of the orientation of the light, the horizontal plane is actually only "horizontal" when the antenna and reflector are in such position that the beam would be projected tangent to the earth's surface.

If the received pulses reflected from the object are of unequal intensity, it is an indication that the antenna system is not pointed directly at the object, but to one side of the object.

The echo or reflected pulses which are received are viewed on a pair of oscilloscopes, of which one indicates the pulses received during the up and down positions of the rotating radiating element, and the other indicates the pulses received during the right and left positions of the rotating radiating element.

The same general principles thus far described for object detection and location are also utilized in the practice of the present invention; however, this invention comprises a simplified and improved system for detecting and locating objects by means of pulses and their echoes. Briefly stated, the present invention has the following advantages over prior object locating systems using pulses:

1. It is not a null indicating method, wherein the indication is the same when the antenna is pointed exactly on the target as when it is pointed far off the target or for no transmission or reception.
2. The requisite circuits are simple and are easily serviced.
3. The indication is positively locked with both the lobe position and the transmitter so that the system is automatically synchronous.
4. The indication is free of ambiguity.
5. The information presented is selected automatically to be free of any extraneous matter, i. e., the two scopes used for azimuth and elevation indication have only signals from one target on them, thus avoiding any possibility of confusion.
6. The control of the system for selecting any target echo is simple and flexible, and any possibility of misinterpretation is avoided.

A detailed description of the invention follows in conjunction with a drawing, wherein.

In brief, the persent invention makes use of three oscilloscopes or cathode ray tubes; one for indicating range or distance of the target or object from the apparatus of the invention, one for indicating azimuth or horizontal position, and the other for indicating elevation or vertical position of the object to be detected. With these three oscilloscopes, it is possible to determine immediately the range, and to train the antenna exactly on the target. The invention gives a positive indication of the direction in which to turn the antenna to correct for error in pointing. The azimuth and elevation indicators show the magnitude and direction of the pointing error and do not indicate actual bearing and azimuth in degress or mils. Of prime importance, is the fact that the system operates efficiently and independently of any time flutter or variation in the transmitted pulses.

Figures 1, 2:
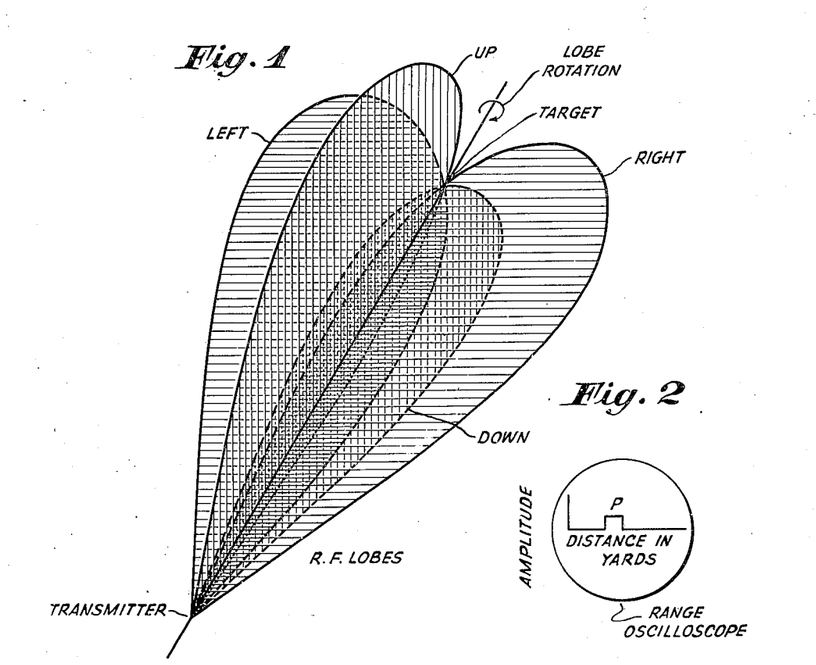
Fig. 1 illustrates the antenna pattern of a lobe switching system employed in the present invention.
Figs. 2 and 3 diagrammatically illustrate pictures on the range oscilloscope of the invention under the two conditions when there are no echo pulses present and when there are echo pulses present.

Referring to Fig. 1, there is shown the antenna pattern of a lobe switching system with which the system of the invention is designed to function. There are shown four radio frequency lobes corresponding to the up, right, down and left quadrants of the circle in which the antenna rotates. The direction of lobe rotation is shown by the arrow, although it should be understood that the operation of the indicating equipment is independent of the direction of lobe rotation. The transmitter is located at the apex of the overlapping lobes. The antenna will be pointed exactly to the target or object being located when the latter is at the point of intersection of all four lobes. This point is designated by the legend "target."

Figure 6:
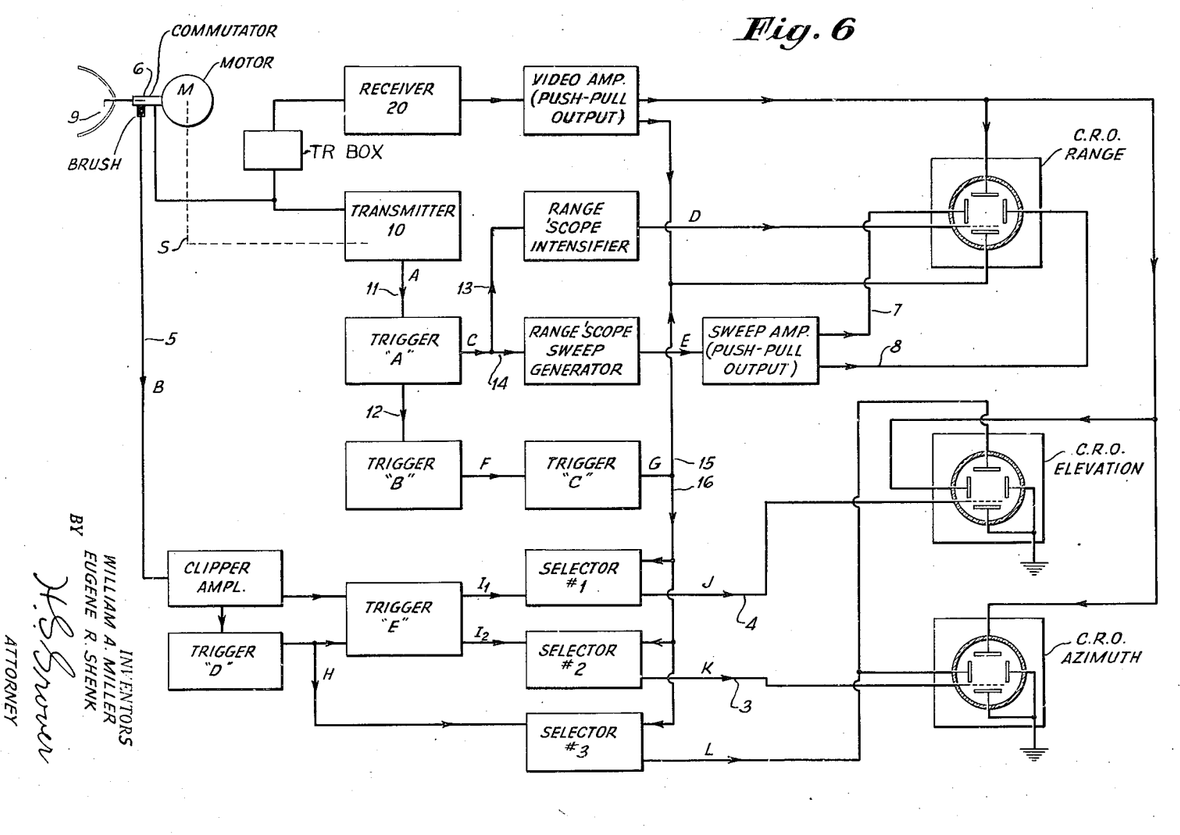
Fig. 6 diagrammatically illustrates an embodiment of the object detection system of the present invention.

Fig. 6 shows in block diagram the complete obstacle detection radio locating system of the invention. This system includes a transmitter 10 and a receiver 20, both coupled through a TR box to the offset dipole antenna 9, and a multiplicity of associated circuits described in more detail hereinafter connected with three oscilloscopes. These oscilloscopes are cathode ray devices of conventional types having vertical and horizontal deflection elements such as plates. The term "scope" will be used herein as an abbreviation for the word "oscilloscope." One of these scopes is the range scope, another is the elevation scope, and a third is an azimuth scope. The letters CRO above the legend for each scope are the first letters of the words "cathode ray oscilloscope." A single motor M is employed to drive the antenna 9 and the transmitter 10. The motor M is preferably a synchronous motor and drives the transmitter 10 via a shaft S. The dipole 9 is located off the center of a parabolic reflector, preferably of the mesh type, behind which is located a searchlight (not shown). The motor M is arranged to rotate the antenna at a speed of sixty revolutions per second, whereas the transmitter 10 is designed to fire or deliver a pulse of radio frequency energy to the dipole 9 during each quadrant position of each revolution of the dipole antenna. Thus, the transmitter 10 will deliver 240 pulses per second to the dipole antenna. Transmitter 10 is preferably of the magnetron type, and so arranged as to deliver pulses of the order of one or two microseconds duration to the antenna. The receiver 20 receives the pulse reflected from the object to be detected and located. Both the receiver and the transmitter are connected to the same antenna 9 through the TR box. This TR box is a device which serves to uncouple the receiver from the antenna while the transmitter is transmitting a pulse and to uncouple the transmitter from the antenna when the transmitter is not in actual operation, so that between transmitted pulses maximum received power from the antenna may be delivered to the receiver. Several such TR devices have been developed for use with military radio locating pulse systems. One suitable TR device is described in Patent 2,401,717 issued June 4, 1946 to I. Wolff et al.

The transmitter 10 may comprise any one of the systems of the type described by Lindenblad in his copending applications Serial No. 477,779, filed March 2, 1943, now Patent No. 2,402,422, issued June 18, 1946, or Serial No. 479,220, filed March 15, 1943, now Patent No. 2,449,078, issued September 14, 1948, preferably the former, as illustrated in Fig. 2 thereof.

Figure 3:
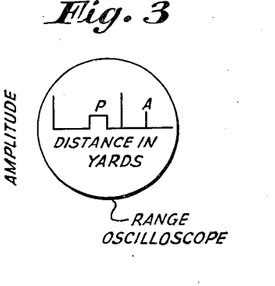

The output of the receiver is coupled by way of a video amplifier (having a push-pull output) to certain of the deflection plates of all three scopes, as shown. The range scope is operated in such a way that the distance from the origin of the sweep to the position of the video echo or reflected pulse on this scope is proportional to to the distance from the observer to the target. The beam or ray spot on the range scope sweeps out a path (as shown in Fig. 2) in the absence of any echo or reflected pulses. If there are echoes present, corresponding to pulses reflected from the target or other objects, they will appear as shown by the vertical lines in Fig. 3, assuming the presence of two objects or targets which reflect pulses. The operator has available a positioning control for the pedestal P (note Figs. 2 and 3) and is able to choose one of the echo pulses, let us say the one labeled A in Fig. 3, under which he positions the pedestal. This pedestal P is merely a local pulse generated in the apparatus of Fig. 6, and impressed upon the range scope, as will be described in more detail hereafter.

The pedestal pulse P on the range scope is also the "intensifier pulse" for the elevation and azimuth scopes. The "intensifier pulse" is that pulse which is applied to the control grid of the oscilloscope in order to overcome the cut-off bias normally applied to this grid and thus renders the cathode ray beam visible. At this time, it should be understood that all three scopes are normally biased to cut-off (i. e., biased to prevent the electron beam from reaching the fluorescent screen) and require intensifier pulses to render the cathode ray beams visible. The elevation and azimuth scopes differ from the range scope in that they have no sweep voltage (saw-tooth) applied to the horizontal deflection plates but do have a short pulse applied to these plates to displace one echo signal with respect to the other, i. e., the up from the down and the right from the left, on the screen. On the elevation scope two signals are seen, one corresponding with the transmitted lobe up and one corresponding with the transmitted lobe down. These lobes are shown in more detail in Fig. 1, described above. These two echo signals are separated from each other on the elevation scope by the displacement pulse in order that the signal amplitudes for these two lobe positions may be compared or distinguished. On the azimuth scope, the same presentation is given with the exception that here, by suitable switching arrangement, the echo signals seen on the screen correspond to transmitted lobes in the right and left position of the pattern of Fig. 1.

The elevation and azimuth scope intensifier and signal displacing pulses are synchronized with the transmitter pulse and are keyed between these two scopes by switching pulses generated synchronously with the rotation of the transmitted lobes. This gives positive indication and lock-in so that azimuthal signals cannot be seen on the elevation scope and elevation signals cannot be seen on the azimuth scope. Further, it is not necessary to distribute the echo signals to the various scopes as has been required heretofore in radio locator systems. In the present invention all of the echo signals are applied to all the scopes all the time. The desired echoes are shown on the proper scopes by suitable selection and distribution of the intensification pulses to be applied to the scopes.

Figure 4:
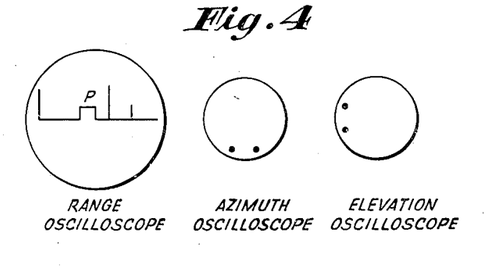
Fig. 4 illustrates the appearance of the screen on the three oscilloscopes used in the invention; namely range, azimuth and elevation, in the presence of echoes from two targets under one condition of operation.
Figure 5:
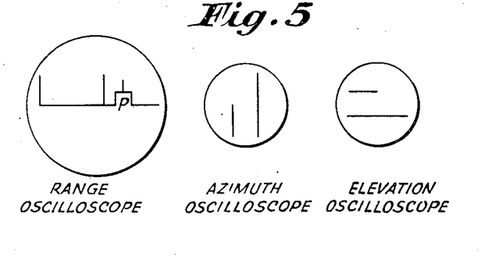
Fig. 5 illustrates the appearance of the screen of the same three oscilloscopes of Fig. 4 under another condition of operation.

Fig. 4 shows the appearance of the three scopes when the pedestal P is not positioned under an echo. The azimuth and elevation scopes have been shown smaller than the range scope for the purpose of convenience and economy. The two vertical lines on the range scope of Fig. 4 indicate reflected pulses (echoes) from two different targets or objects. The two dots displaced in the horizontal direction on the azimuth scope indicate the beam or ray spots corresponding to the left and right lobe positions, whereas the two dots on the elevation scope displaced in a vertical direction indicate the beam or ray spots corresponding to the up and down lobe positions. It should be noted at this time that the orientation of the azimuth and elevation spots are not important except for the convenience of the operator. Fig. 5 shows the possible appearance of the echo signals on the same three scopes of Fig. 4 when the antenna is pointed to the right and below the target, after the pedestal P has been positioned under a particular echo pulse corresponding to the target upon which the antenna is to be trained. It should be noted that now the azimuth scope shows two vertical lines of different lengths while the elevation scope shows two horizontal lines of different lengths. These lines give an indication of the direction in which to turn the antenna to correct for error in pointing the antenna. Correction of the direction of pointing of the antenna equalizes the lengths of the two lines on both the azimuth and elevation scopes.

Figure 7:
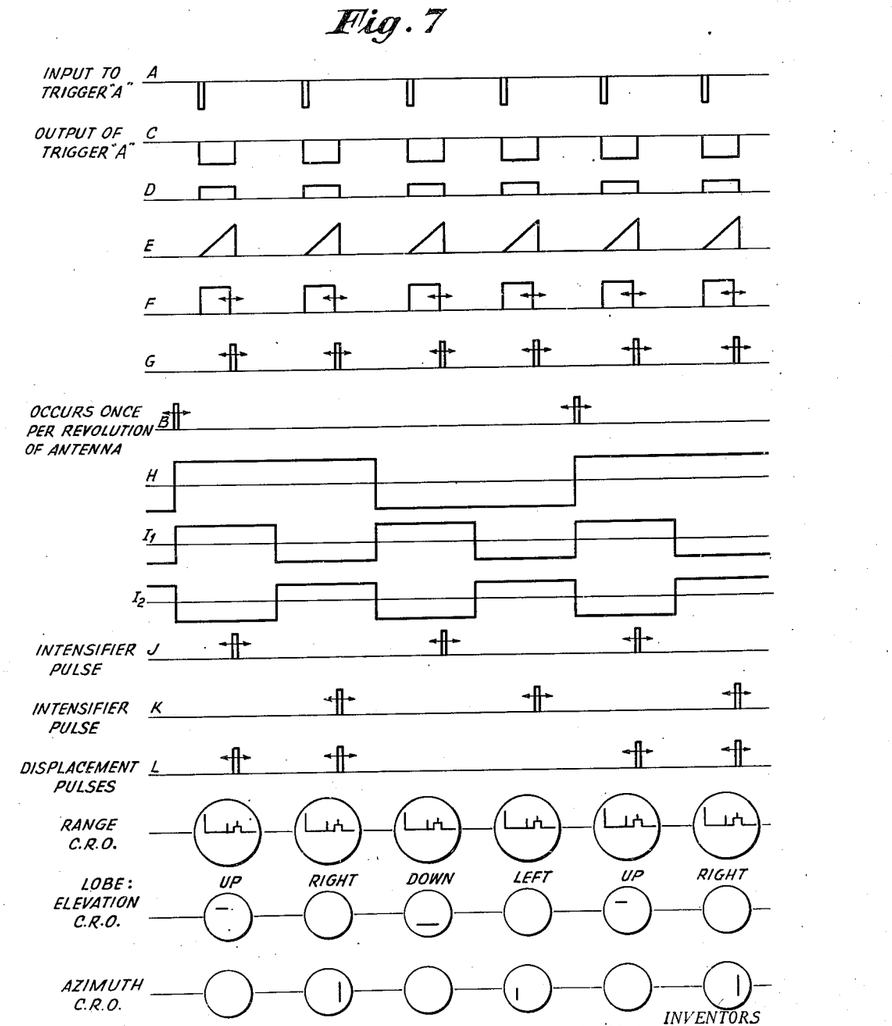
Fig. 7 is a series of graphs given in explanation of the operation of the system of Fig. 6.
Figure 8A:
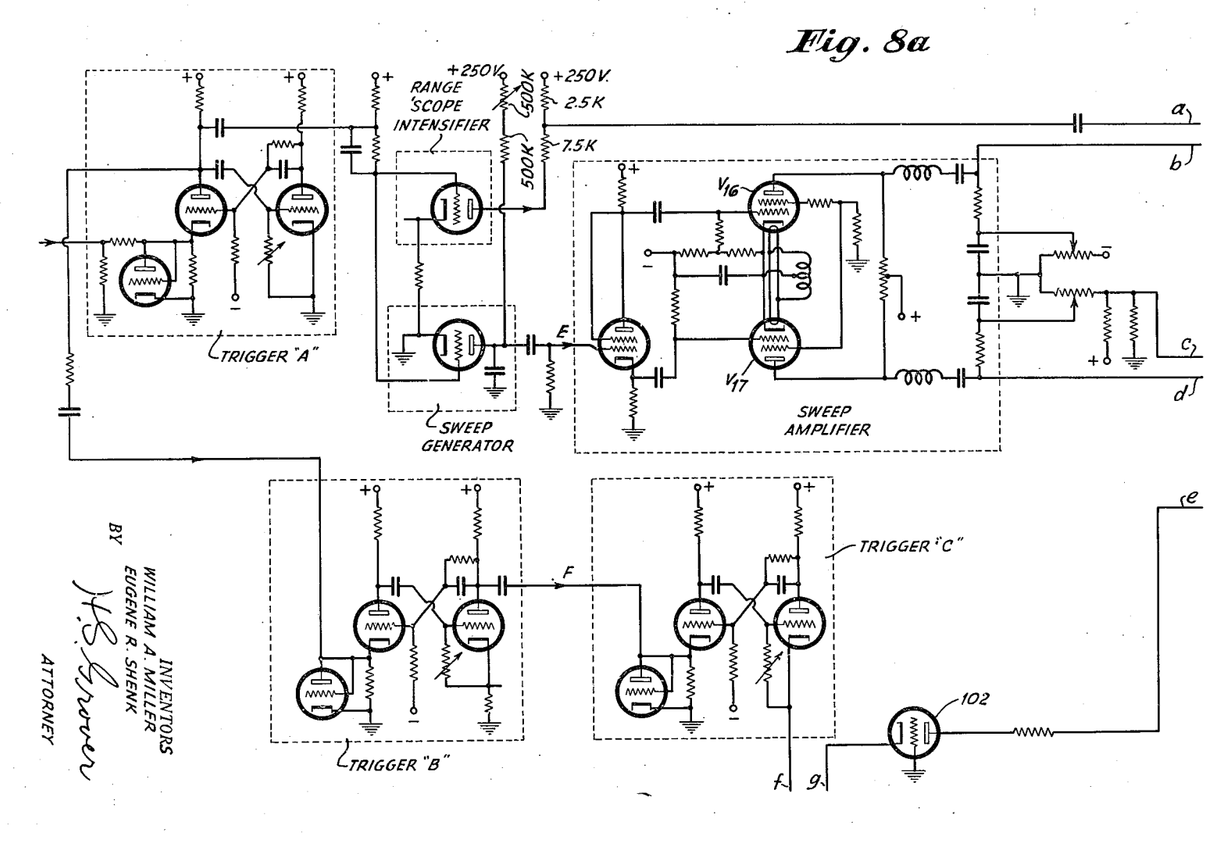
Figs. 8a, 8b, 8c and 8d, taken together, illustrate novel circuit details of the system of Fig. 6.
Figure 8B:
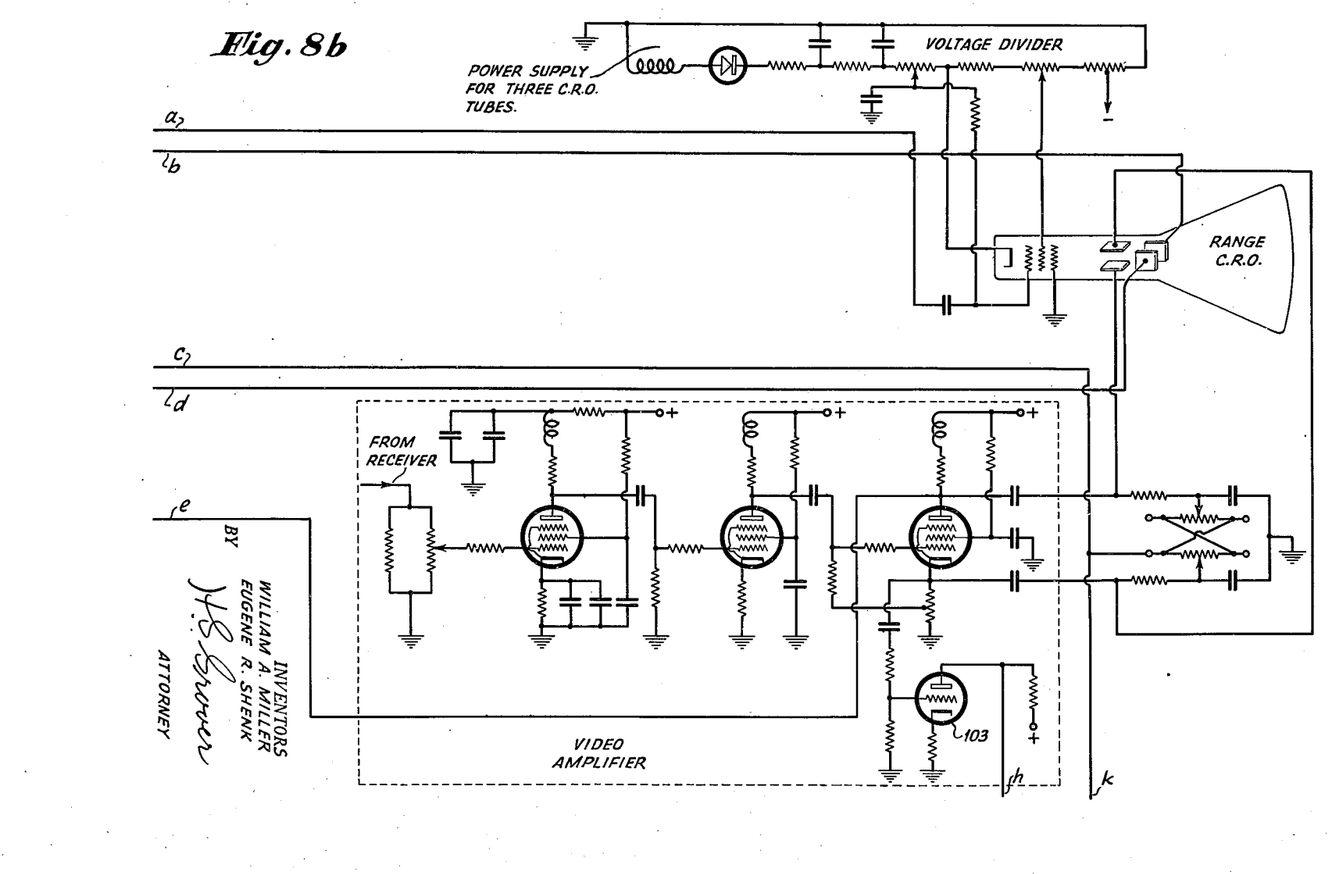
Figures 8C, 9:
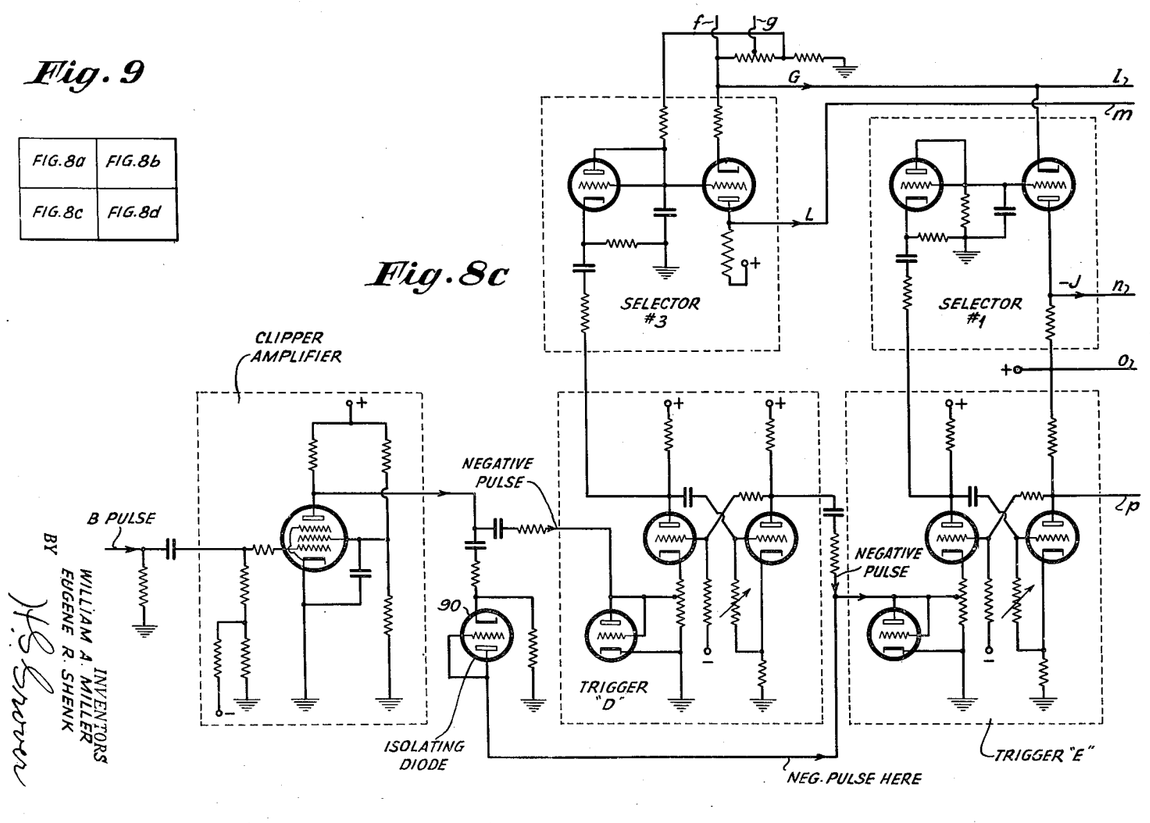
Fig. 9 shows by boxes how the different Figs. 8a, 8b, 8c and 8d fit together.
Figure 8D:
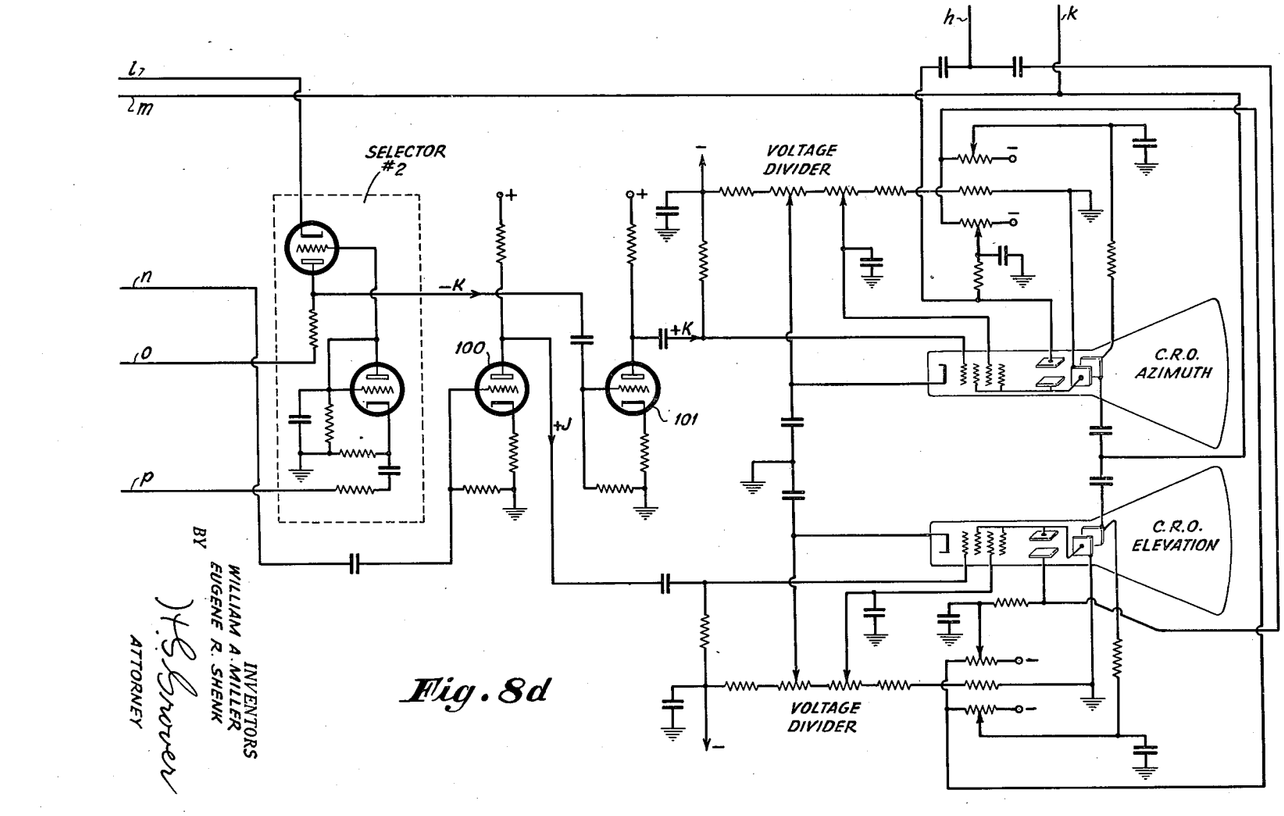

A more detailed description of the system of Fig. 6 will now be given, with particular reference to the graphical representation of Fig. 7. The curves of Fig. 7 (indicated by different reference letters) represent various wave forms of pulses and their phase relations as they appear in the system of Fig. 6. The same reference letters have been shown in Fig. 6 at points where these pulses appear in the system. The pulses of Fig. 7 are accurately shown in their correct relative phase relations, although they are not drawn to absolute amplitude scale. At the bottom of Fig. 7 are shown the three scopes, suitably labeled with various markings indicative of the echo signals returned from a target during the four quadrants of the revolution of the antenna. These quadrants are designated by the lobes marked "up," "right," "down," "left," "up," "right." The transmitter 10 is arranged so that every time a radio frequency pulse is emitted from the antenna 9, there will be a direct current pulse A (note Fig. 7) impressed on trigger A over lead 11 and through trigger A to trigger B over lead 12. Thus, there will be 240 direct current A pulses per second supplied by the transmitter 10, one produced for each lobe or quadrant, assuming a speed of sixty revolutions per second for the antenna. Trigger A is adjusted so that its output pulse looks like C (Fig. 7) and this pulse has the necessary time duration for the distance range to be observed. The C pulse, it should be noted, has a duration much longer than the A pulse and, by way of example, may have a time duration of 300 microseconds to cover a range of 50,000 yards between the antenna and the object to be detected or observed. The output of trigger A. namely pulse C, is impressed via lead 13 on a tube labeled "Range scope intensifier," which tube produces the intensifier pulse D for the range cathode ray oscilloscope. An inspection of Fig. 7 will show that the pulse D is inverted with respect to and of the same length as pulse C. The output pulse C is also impressed over lead 14 onto the sweep generator circuit for the range scope in order to produce a saw-tooth wave form E (Fig. 7). Pulse C is of negative character and starts the sweep generator and controls the duration of the saw-tooth voltage wave. It should be noted that the durations of the pulse C and the saw-tooth voltage wave E match each other in time, and that the intensifier pulse D also has substantially the same time interval. This saw-tooth wave form E is amplified in a sweep amplifier having a push-pull output and then impressed on the horizontal plates of the range scope over leads 7 and 8. Thus, every time a pulse is transmitted by transmitter 10, the range scope forms a picture (shown in Fig. 7) opposite the legend "Range CRO," assuming the presence of echoes from two targets in order to demonstrate the principles of operation, and also assuming that the pedestal P is arranged under one of the echo pulses in a manner described in more detail hereinafter. The output of trigger B is shown as F (Fig. 7) while the output of trigger C upon which the F pulse is impressed is shown as G (Fig. 7). Triggers B and C combine to form an embodiment of the type described in copending application Serial No. 447,633, filed June 19, 1942 by W. A. Miller, one of the joint applicants herein, now U. S. Patent 2,402,917, granted June 25, 1946.

The purpose of the combined trigger units B and C is to provide an electronic circuit furnishing an output pulse of controllable time duration and which starts a controllable time later than an input pulse. The arrows shown on the pulses F and G indicate variable duration or delays under control of the operator. The output pulse of trigger C (designated by G) is delayed a variable amount in time by controlling the pulse length of trigger B. The length of output pulse from trigger C is constant in time. The output of trigger C is, among other things, connected to the range CRO via lead 15 to produce the pedestal P of Fig. 2. This pulse G is also used to intensify and deflect the azimuth CRO and the elevation CRO in a manner described hereafter.

In order to give correct indication, it is necessary that the system of the invention be able to distinguish between lobe left and lobe right (for azimuth), and between lobe up and lobe down (for elevation), and that this information should be presented at the proper time and on the proper scope.

In In order to synchronize the indication with the rotation of the lobes, a commutator 6 on the antenna motor is used to supply a pulse B (note Fig. 7) once for each revolution of the antenna 9. Pulse B is phased with respect to the lobe rotation in such a way as to properly identify the lobe position, in order that the information is presented in such a fashion that the operator is least confused. This is done by rotating the commutator 6 with respect to its shaft until the proper phase relation is secured. This proper phase relation is shown in Fig. 7, wherein the pulse B is properly synchronized with respect to the other pulses. It should be noted that the pulse B occurs immediately prior to the "up" lobe position. Pulse B, which is generated by the commutator 6, is supplied via lead 5 to a clipper amplifier stage and thence to triggers D and E connected in cascade. Trigger D produces pulse H, while the output of trigger E comprises two pulses identified as $I_1$ and $I_2$, respectively. The recurrence rate of square wave pulses $I_1$ and $I_2$ is twice that of H and all three of these pulses (H, $I_1$ and $I_2$) are adjusted to be positive fifty percent of the time. The $I_1$ square wave pulse is 180° out of phase with the $I_2$ square wave pulse, and the H pulse has a duration twice that of the $I_1$ and $I_2$ pulses (as shown in Fig. 7).

The two outputs of trigger E (namely, $I_1$ and $I_2$) are applied respectively to selector 1 and selector 2, while the output of trigger D is applied to selector 3. The keyers are so arranged that they will pass through them the pulse G applied thereto by trigger C over lead 16 only when their respective switching waves H, $I_1$ or $I_2$ are positive. The output of selector 1 is represented by pulses J in Fig. 7. The output of selector 2 is represented by pulses K of Fig. 7, while the output of selector 3 is represented by pulses L of Fig. 7. It should be noted that the J pulses occur during the time the $I_1$ pulses are positive, and that the K pulses occur during the time the pulses $I_2$ are positive, while the L pulses occur during the time the H pulses are positive. The J and K pulses occur at different times, while the L pulses occur simultaneously with certain ones of both the J and K pulses, as shown in Fig. 7. The J pulse is impressed on the grid of the elevation scope via lead 4. The K pulse is impressed on the grid of the azimuth scope via lead 3. These pulses are intensifier pulses and render the cathode ray traces of the elevation and azimuth scopes visible for the duration of the J and K pulses. But these two traces are not made visible simultaneously, due to the fact that the J and K pulses occur at different times.

At this point in the operation of the system, signal sorting has been achieved; i. e., only signals returning when the lobe is up or down will be visible on the elevation scope and only signals returning when the lobe is right or left will be visible on the azimuth scope. Two things, however, remain to be done; namely, the separation of the signals on the azimuth and elevation scopes and the identification of the lobes. Both of these are accomplished by using the L pulses of Fig. 7. These L pulses are obtained by applying the H and G pulses of Fig. 7 to selector 3. The L pulses are impressed simultaneously on one set of deflection plates on both the azimuth and elevation scopes. The choice of the deflection plates is immaterial since orientation of the scope pattern by rotating the scope tubes about the center of the axis of optional with the operator. In Figs. 4, 5, 6 and 7 the deflection has been assumed to be vertical for the elevation scope and horizontal for the azimuth scope. It should be observed at this time that although the displacement pulses L are applied both to the azimuth and elevation scope simultaneously, it is not possible to introduce error on this account because these two scopes are intensified alternately. This feature provides both the separation between signals on the same scope necessary for matching amplitudes of the echo signals on the elevation scope with lobes up and down and for matching the echo signals on the azimuth scope for lobes right and left, and, with the proper phasing of pulse B (Fig. 7), the correlation or identification of the lobes.

As an aid in visualizing the operation of the invention, let us now consider the lower part of Fig. 7. Let us assume the lobe is in the "up" position and pulse B has been formed starting triggers D and E. The transmitter 10 fires, producing pulse A which is supplied to the triggers A and B. Trigger A controls the range sweep, while trigger B controls the time delayed pulse from trigger C. This time delayed pulse G from trigger C is impressed on the range scope and its time delay is so arranged that it appears as a pedestal under one of the pulses, as shown in the row marked "Range CRO," Fig. 7. This occurs every time a pulse is transmitted and for the assumed echoes all pictures on the range scope will appear the same as shown in Fig. 7.

Simultaneously with the operation of trigger C, the pulse J is impressed on the control grid of the elevation C. R. O., rendering the spot visible and at the same time pulse L lifts this spot up. The video or echo signal then traces the horizontal line indicated on Fig. 7 on the elevation C. R. O. under the "up" lobe, and this horizontal line is proportional to the signal strength of the echo returning from the target in this particular lobe. The same video or echo signals are impressed upon the deflection plates of the azimuth C. R. O., but since this tube is not intensified at this time (K is absent) no signal will appear on its screen.

Next, the lobe swings right and the transmitter 10 pulses again, starting all circuits interconnected with it anew, but the triggers D and E started by pulse B continue uninterrupted. The same video or echo signals are impressed on the deflecting plates as before, but due to the selecting action of selectors 1 and 2 (J is now absent and K is present) K intensifies the azimuth C. R. O. and the video echo signal traces out a vertical line on it, while the presence of L assures that it is seen in the displaced position. (Note Fig. 7, azimuth C. R. O., when the lobe is right.) It will be seen that we now have one signal on the elevation scope for lobe "up" (displacing pulse L present) and one signal on the azimuth scope for lobe "right" (displacing pulse L present).

As the antenna driving motor turns on toward the lobe "down" position, trigger D (by virtue of its design) returns to its negative state causing selector 3 to block the pulse L for approximately one-half of the rotation, for which reason there are no displacing pulses L for lobes "down" or "left." Trigger D is so arranged that it generates pulse H immediately prior to the "up" lobe position and terminates pulse H immediately prior to the "down" lobe position, under control of pulse B. Putting it in other words, the commutator on the armature driven motor is arranged to produce pulse B at the desired time, to initiate the foregoing action.

When the lobe is down, the transmitter 10 again sends out a pulse corresponding to A, but J is now present and K is absent, so that the video signal traces a horizontal line on the elevation C. R. O. (Fig. 7) in a different and lower position than it did for lobe "up." When the lobe is "left," the operation is similar, except that the signal is rendered visible as a vertical trace on the azimuth scope and in a different position than the trace for lobe "right."

Since the transmitted pulse recurrence rate is greater than the flicker rate of vision, the picture presented on the fluorescent screens of the scopes appears continuous and similar to that shown in Fig. 5.

When the azimuth and elevation scopes are as shown in Fig. 5, the antenna controls are manually operated until the azimuth marks are of equal size and the elevation markings also of equal size. When these markings on both azimuth and elevation scopes are equal, then the target will be exactly centered as in Fig. 1; that is, at the point of intersection of all four lobes. A searchlight positioned behind the antenna can then be turned on and will illuminate the target. In practice, there will be individual operators for each of the range, azimuth and elevation scopes. The operators for the last two scopes will have separate controls for manually turning the antenna, and these operators will inform the range operator when the markings are of equal size, at which time the range operator can push a button to turn on the searchlight.

The circuit details of the system of Fig. 6 are shown in Figs. 8a, 8b, 8c and 8d, taken together, but these last figures do not show the pulse transmitter apparatus, the receiver or the TR box indicated by the rectangles of Fig. 6, since no claim of invention is made by us to these circuits per se. The circuit enclosed within the boxes of Figs. 8a, 8b, 8c and 8d, which correspond to the boxes of Fig. 6, have been labeled with the same legends.

Trigger A is of the unbalanced (self-restoring) type. It should be noted that the A pulses from the transmitter are supplied to the cathode of one of the electrode tube structures of this trigger.

The range scope intensifier apparatus as well as the range scope sweep generator is described in detail in our copending application Serial No. 501,764, filed September 10, 1943, now Patent No. 2,431,766, issued December 2, 1947. The triode structures shown for both of these pieces of apparatus are normally biased to pass current, and the negative pulse C from the trigger A has such magnitude that it momentarily causes both of these triode structures to stop passing current, thus producing the positive intensifier pulse D and enabling a charge to build up gradually on the condenser in the output of the sweep generator triode. This condenser discharges through the associated triode when the pulse C terminates, at which time the triodes will again pass current. The high values of resistors in the grid circuits of these two triode structures enables only that portion of the C pulse to be utilized which has the greatest rate of change at the beginning and end.

Triggers B and C are unbalanced (self-restoring) triggers which together comprise a circuit for delaying a pulse by a desired interval. These triggers are similar to the system described in U. S. Patent 2,402,917, supra.

The clipper amplifier is so biased as to give a square wave output pulse when a pulse of positive sign and sufficient magnitude (as supplied by pulse B) is applied to its grid. Trigger D is an unbalanced (self-restoring) trigger similar to trigger A except for its active time. The active time of trigger D is the longest of any of the triggers of this system and in the particular embodiment tried out in practice and described herein is $1/120$ of a second, assuming a transmitter system firing 240 pulses per second; that is, a transmitter firing one pulse for each quadrant or lobe with the antenna rotating sixty times per second. Trigger D provides one positive pulse for each revolution of the antenna.

Vacuum tube electrode structure 90 is an isolating diode between the clipper amplifier and the trigger E, and serves to prevent interaction between the triggers E and D. Effectively, we have a unidirectional path from trigger D to trigger E. Trigger E is an unbalanced (self-restoring) trigger, similar to trigger A, except for the active time. Under the conditions outlined for trigger D, trigger E has an active time of $1/240$ second; i. e., trigger E provides two positive pulses for each revolution of the antenna.

Triggers D and E are described in copending application Serial No. 505,013, filed by us on October 5, 1943, now U. S. Patent 2,390,608, granted Dec. 11, 1945.

Selectors 1, 2 and 3 are alike in principle, except for the different time constants of their elements. Each selector is shown with an isolating diode to prevent damage to the selector tube on account of the high positive voltage supplied by the triggers D and E. The diode is responsive to a negative pulse from the trigger D or E to provide cut-off bias for the selector tube. The diode allows the grid of the selector tube to rise only to zero bias when the output of the trigger associated therewith goes positive. Since the output pulses from the selectors 1, 2 and 3 are negative, the pulses from selectors 1 and 2 must be inverted before applying them as intensification pulses to control grids of the azimuth and elevation scopes, and this is done by means of resistance coupled triode amplifiers 100 and 101.

The range scope intensifier pulse is supplied from a triode operated in a positive grid threshholding circuit. A negative input pulse applied to the grid of this tube causes essentially no response in the plate current until a certain negative or threshholding level is reached, after which a further increase in the negative voltage applied to the grid of the tube cuts off the plate current and a positive voltage pulse of steep leading and trailing edges is produced in the plate circuit. This triode tube passes current in the absence of a negative input pulse.

The range scope sweep generator consists of a tube normally passing current and connected in shunt with a condenser. When a negative input pulse is impressed on the tube, this relatively low shunt resistance path across the condenser is removed and the condenser then begins to charge and continues charging until such time as the negative input pulse ceases. When the tube commences to pass current after the negative input pulse ceases, the tube provides a discharge path for the condenser.

The sweep amplifier consists of a paraphase (phase inverter) amplifier tube driving a push-pull class A amplifier. It should be noted that the bias applied to the grid of $V_{17}$ is approximately double the bias applied to the grid of $V_{16}$. This is done purposely since the pulses applied to the grid $V_{17}$ are heavily weighted in the positive direction, whereas the pulses applied to the grid of $V_{16}$ are heavily weighted in the negative direction. The push-pull output of the class A amplifier is coupled to the horizontal plates of the range C. R. O.

The video amplifier is of a type known in the art. It consists of a three stage shunt compensated video amplifier circuit. Each stage has inductance in its anode circuit for compensating for the output capacitance of its own stage and for the input capacitance of the succeeding stage and for the stray lead capacitance. Output from the last stage of this video amplifier is taken in push-pull, i. e., from the cathode and anode, to provide symmetrical deflection of the range scope.

The output from trigger C is arranged by means of triode 102 to appear at the anode of the last stage of the video amplifier as a negative pulse of the same polarity as any video pulse which might appear at this same anode. Thus, instead of applying the G pulses of Fig. 7 directly to the bottom vertical deflection plate of the range scope, as shown in Fig. 6, in practice the output of trigger C causes the video amplifier to apply a negative pulse to this deflection plate. Tube 102 is a grounded grid tube which is cut off in the absence of pulses from trigger C. A negative pulse from trigger C to the cathode of tube 102 allows this tube to pass current and thus causes a voltage drop to appear at the anode of the last stage of the video amplifier.

Since it is not desired that the pedestal pulse which is taken from the anode of the last stage of the video amplifier (pulse G) appear to any great degree on the azimuth and elevation scopes, the video pulses for these last two scopes are obtained from the cathode of the last stage of the video amplifier. Since the pulse from the cathode of the last stage of the video amplifier is of insufficent amplitude to deflect the beams on the azimuth and elevation scopes, we provide an amplifier 103 to amplify the video pulse.

Although numerous advantages of the present invention have been set forth above, the following advantages are stressed. The system of the invention operates efficiently independently of any time flutter or variation in the transmitted pulses. Among the reasons for this efficient and reliable operation are:

(a) Antenna rotation, initiation of the firing of the transmitter and the pulse which actuates the selector circuits are all obtained from a common shaft. Therefore, all these operations are accurately and permanently synchronized.

(b) Formation of the various pulses used to control the three cathode ray tubes are all synchronized to the actual firing of the transmitter. By way of illustration, if the transmitter should fail to fire, i. e., fail to transmit a pulse, then the above-mentioned control voltages would not be formed. This is in sharp contrast to the usual synchronous systems.

(c) The various sorting and selecting voltage waves sufficiently overlap the pulses to be selected and properly distributed, i. e., the pulses which are formed as a result of the firing of the transmitter, as to permit of a very great "dither" or time variation between transmitted pulses. That is to say, that while 240 pulses will be transmitted every second, the time spaces between pulses need not be exactly $1/240$ of a second. In the usual synchronous systems, any variations in the timing of the transmitted pulses cause similar lateral "dithers" or displacements of the traces on the cathode ray tubes resulting in a blurring of the pictures. No such blurring of the trace is possible in the present invention because all control pulses, except those used exclusively for selecting and distributing, are initiated by the pulse from the transmitter. The present invention might properly be termed auto-synchronous, because the control pulses for the cathode ray tubes are automatically synchronized with the transmitted pulse.

(d) The system of the invention is lighter in weight than prior object detection systems and simpler in design.

In one embodiment of the invention tried out in practice, the system of the invention transmitted ultra high frequency pulses of two microseconds duration separated by approximately 4100 microsecond intervals. These extremely short duration pulses were sent out at a rate of 240 pulses per second, or one pulse for each lobe or quadrant of revolution of the antenna. The range scope covered a time interval of 300 microseconds, which is equivalent to a range of approximately 50,000 yards or thirty miles. Although the customary searchlight employed can only reach out about nine miles, the extremely large range of the invention gives sufficient time to the operators to center the target exactly at the point of intersection of all four lobes and to maintain the target exactly centered until the target comes within the optical range of the searchlight.

What is claimed is:

1. An object detection and locating system comprising a rotating antenna, a pulse transmitter coupled to said antenna, a receiver also coupled to said antenna, a device for uncoupling said receiver from said antenna when said transmitter sends a pulse to said antenna, three cathode ray oscilloscopes having ray deflection elements coupled to the output of said receiver, and means for rendering the beam traces of two of said oscilloscopes alternately visible and the beam trace of said third oscilloscope visible at all times that the other oscilloscopes are visible.

2. In a radio locating system, in combination, a rotatable antenna, a pulse transmitter coupled to said antenna and adapted to produce pulses at a faster rate than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, a circuit for uncoupling said receiver from said antenna during the time said transmitter is actually sending pulses, a pair of cathode ray oscilloscopes having ray deflection elements coupled to the output of said receiver, a control grid for each of said oscilloscopes, and circuits synchronously operated with said drive means and coupled to said control grids for rendering said oscilloscopes alternately visible.

3. In a radio locating system, in combination, a rotatable antenna, a pulse transmitter coupled to said antenna and adapted to produce pulses at a faster rate than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, a circuit for uncoupling said receiver from said antenna during the time said transmitter is actually sending pulses, a pair of cathode ray oscilloscopes having ray deflection elements coupled to the output of said receiver, a control grid for each of said oscilloscopes, circuits synchronously operated with said drive means and coupled to said control grids for rendering said oscilloscopes alternately visible, and a third cathode ray oscilloscope having two sets of ray deflection elements, connections from one set of said elements to the output of said receiver, and a saw-tooth sweep generator coupled to the other set of said elements.

4. In a radio locating system, in combination, a rotatable antenna, a pulse transmitter coupled to said antenna and adapted to produce pulses at a faster rate than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, first, second and third cathode ray oscilloscopes having ray deflection elements coupled to the output of said receiver, a control grid for each of said oscilloscopes, a saw-tooth sweep generator coupled only to said first oscilloscope, and circuits synchronously operated with said drive means and coupled to said control grids for rendering said second and third oscilloscopes alternately visible and said first oscilloscope visible at all times that said second and third oscilloscopes are visible.

5. A radio locating system comprising a transmitter for periodically sending short wave carrier pulses of short duration spaced in time an amount which is large compared to the time of each pulse, a directive antenna for said transmitter including a parabolic reflector having a radiating element positioned in front of it, a synchronous motor for driving said transmitter and for effectively rotating said antenna in a circular path, whereby said antenna periodically assumes a plurality of beam positions and said transmitter fires during each of said beam positions, a receiver coupled to said antenna, a pair of oscilloscopes having ray deflection elements coupled to the output of said receiver, a control grid for each oscilloscope, and circuits synchronously operated with said transmitter and antenna for alternately applying to the control grids of said oscilloscopes potentials during different beam positions of said antenna.

6. In a radio locating system, in combination, a rotatable antenna, a pulse transmitter coupled to said antenna and adapted to produce pulses at a faster rate than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, a pair of cathode ray oscilloscopes having ray deflection elements coupled to the output of said receiver, a control grid for each of said oscilloscopes, and circuits synchronously operated with said drive means and coupled to said control grids for rendering said oscilloscopes alternately visible.

7. A radio locator comprising a directive antenna and means for causing said antenna to assume sequentially different positions, a receiver coupled to said antenna, three cathode ray oscilloscopes having ray deflection elements coupled to the output of said receiver, each of said oscilloscopes also having a screen and means for projecting a cathode ray beam toward said screen, and pulse producing means synchronized with said antenna for causing the cathode ray beams of two of said oscilloscopes to alternately impinge on the screens of said two oscilloscopes and for causing the cathode ray beam of the third oscilloscope to impinge on the screen of the third oscilloscope each time the beam of either one of the first two oscilloscopes impinges on its screen.

8. A radio locator comprising a directive antenna and means for causing said antenna to assume sequentially different positions, a receiver coupled to said antenna, first, second and third cathode ray oscilloscopes having ray deflection elements coupled to the output of said receiver, a saw-tooth voltage wave generator coupled to certain deflection elements of only said first oscilloscope, said second and third oscilloscopes each including a control grid normally biased to prevent the passage of the cathode ray beam therethrough, and pulse producing means synchronized with said antenna for alternately overcoming the cut off bias on the control grids of said second and third oscilloscopes.

9. A radio locator system comprising a directive antenna and means for causing said antenna to assume sequentially different positions, a pulse transmitter coupled to said antenna for transmitting pulses in said different positions, a receiver coupled to said antenna, first, second and third cathode ray oscilloscopes having ray deflection elements coupled to the output of said receiver, a saw-tooth voltage wave generator coupled only to said first oscilloscope, said second and third oscilloscopes each having a control grid normally biased to prevent passages of the cathode ray beam therethrough, and means under part control of said transmitter for alternately overcoming the bias on the control grids of said second and third oscilloscopes.

10. An object detection and locating system comprising a rotating antenna arrangement, a pulse transmitter coupled to said antenna arrangement, a receiver also coupled to said antenna arrangement, a device for uncoupling said receiver from said antenna when said transmitter sends a pulse to said antenna, three cathode ray oscilloscopes each having a control grid normally biased to prevent the passage of the cathode ray beam therethrough and having ray deflection elements coupled to the output of said receiver, and means for alternately overcoming the bias on the control grids of two of said oscilloscopes and for overcoming the bias on the control grid of the third oscilloscope whenever the bias on the control grid of either of the first two oscilloscopes is overcome.

11. In a radio locating system, in combination, a rotatable antenna, a pulse transmitter coupled to said antenna and adapted to produce pulses at a faster rate than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, a pair of cathode ray oscilloscopes having ray deflection elements coupled to the output of said receiver, a control grid for each of said oscilloscopes, means normally biasing said grids to cut off, whereby the cathode ray beam is prevented from passing through said grids, and pulse producing means synchronously operated with said drive means and coupled to said control grids for supplying to said grids pulses of such magnitude and polarity and at such times as to alternately overcome the cut off bias on said grids.

WILLIAM A. MILLER.
EUGENE R. SHENK.

REFERENCES CITED

The following references are of record in the file of this patent:

UNITED STATES PATENTS

| Number | Name | Date |
| --- | --- | --- |
| 833,034 | De Forest | Oct. 9, 1906 |
| 1,035,958 | Girardeau | Aug. 12, 1912 |
| 2,083,242 | Runge | June 8, 1937 |
| 2,189,549 | Hershberger | Feb. 6, 1940 |
| 2,231,929 | Lyman | Feb. 18, 1941 |
| 2,401,717 | Wolff et al. | June 4, 1946 |
| 2,406,316 | Blumlein et al. | Aug. 27, 1946 |
| 2,406,970 | Smith | Sept. 3, 1946 |
| 2,410,666 | Leck | Nov. 5, 1946 |
| 2,412,702 | Wolff | Dec. 17, 1946 |
| 2,412,703 | Wolff | Dec. 17, 1946 |
| 2,415,095 | Varian et al. | Feb. 4, 1947 |
| 2,422,361 | Miller | June 17, 1947 |

FOREIGN PATENTS

| Number | Country | Date |
| --- | --- | --- |
| 552,072 | Great Britain | Mar. 22, 1943 |

OTHER REFERENCES

"Engineering Test Manual for May, 1937, Experimental Types of Detectors for Use Against Aircraft," prepared at Signal Corps Laboratories, Fort Monmouth, N. J., May 17, 1937. (Copy in Div. 51.)

Affidavit of Clarence A. Boddie, dated Dec. 20, 1945, "Principle of Operation of Device of May, 1937 Demonstration." (Original in Div. 51.)